E. E. RODGERS, A. W. WENGER AND C. M. RODGERS.
ANIMAL TRAP.
APPLICATION FILED SEPT. 22, 1919.

1,348,449.

Patented Aug. 3, 1920.

INVENTORS
E. E. Rodgers
C. M. Rodgers
A. W. Wenger
BY Munn & Co. ATTORNEYS

UNITED STATES PATENT OFFICE.

ELMER E. RODGERS, ARTHUR W. WENGER, AND CLAUDE M. RODGERS, OF WARSAW, INDIANA.

ANIMAL-TRAP.

1,348,449.  Specification of Letters Patent.  Patented Aug. 3, 1920.

Application filed September 22, 1919. Serial No. 325,360.

*To all whom it may concern:*

Be it known that we, ELMER E. RODGERS, ARTHUR W. WENGER, and CLAUDE M. RODGERS, citizens of the United States, and residents of the city of Warsaw, in the county of Kosciusko and State of Indiana, have invented a new and useful Improvement in Animal-Traps, of which the following is a full, clear, and exact description.

Our invention relates to improvements in animal traps and it consists in the combinations, constructions, and arrangements herein described and claimed.

An object of our invention is to provide a simple form of animal trap which can be made cheaply and which may be easily set and is readily sprung, thereby insuring the successful operation of the device.

A further object of our invention is to provide a device which may be set without the danger of accidental release and the catching of the fingers.

A further object of our invention is to provide a trap having one or more openings, each of which serves as a means for entrance into the trap, thus increasing the capacity of the trap.

A further object of our invention is to provide a trap in which the bait is placed in a position independently of the trigger or releaser.

Other objects and advantages will appear in the following specification, and the novel features of the invention will be particularly pointed out in the appended claims.

Figure 3:
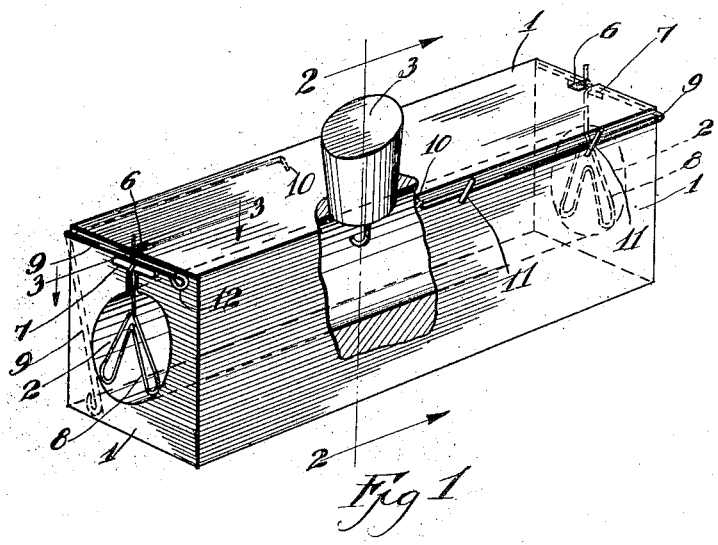
Figure 2:
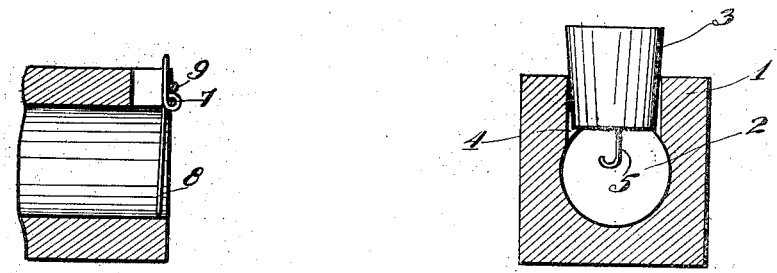

Our invention is illustrated in the accompanying drawings which form part of this application, in which Figure 1 is a reduced perspective view of the device, Fig. 2 is a section along the line 2—2 of Fig. 1, Fig. 3 is a section along the line 3—3 of Fig. 1.

In carrying out our invention, we provide a body portion 1, which is made preferably of wood and which has a longitudinal and cylindrical bore extending therethrough from end to end.

In Fig. 1, we have shown a stopper or plug 3 which is disposed in an opening 4, communicating with a longitudinal bore 3. The stopper is provided with a hook 5 which projects down into the bore 2 and to which bait may be attached.

At the opposite ends of the block are slots 6, each of which is spanned by a staple 7. The staple 7 forms a pivot for the trigger 8, which in the present instance is formed of a single piece of wire bent in the manner shown in the drawings and looped around the pivot 7, the upper part of the trigger being disposed in the slot 6.

The spring catch 9 is formed from a single piece of steel spring wire. As will be clearly seen from the drawings, one end is bent laterally as is shown at 10 and is driven into the side of the body portion. The wire is fastened on the side where it is held by staples 11, is bent around the end of the block and the end of the wire is formed into a loop 12.

From the foregoing description of the various parts of the device, the operation thereof may be readily understood. In the form of the device shown in Fig. 1, the bait may be attached to the hook 5 and the plug may be replaced in the opening 4. Instead of using the hook for bait, flour or sugar may be sprinkled into the opening 4 and the plug 3 may be replaced. Each of the springs 12 may be raised from the dotted line position shown at the left end of Fig. 1 to the full line position on top of the loop by means of which the trigger 8 is pivotally suspended from the pivot 7 as shown in Fig. 3. The springs on the opposite side may be set in the same manner. Now when the mouse attempts to enter either end of the central bore 2, he will move the trigger so as to force off the spring 9, which is under torsion, thereby permitting the spring to clamp the body of the mouse against the side wall of the bore.

It will be observed that the device is very simple in construction. In setting the spring the thumb is placed underneath the loop 12, which is then pushed upwardly until it rests on the loop of the trigger as explained. This brings the thumb out of the way of the spring so that if the latter should slip, the thumb or the fingers will not be caught.

Obviously, the block containing more than one bore, could be made without departing in the least from the spirit or the scope of the invention.

We claim:

1. An animal trap comprising a body portion having a central bore and an opening communicating with said central bore between the ends of the latter, a spring arm secured to the side of the block at each end, said arm being bent around the end of the block and the end of the arm projecting normally in a downward direction but adapted to be forced against torsion to a horizontal position and a trigger suspended at each end of said central bore and adapted to be engaged by said spring arm to hold the latter in said position and to release the spring arm when moved.

2. An animal trap comprising a body portion having a central bore and an opening communicating with said central bore between the ends of the latter, a spring arm secured to the side of the block at each end, said arm being bent around the end of the block and the end of the arm projecting normally in a downward direction but adapted to be forced against torsion to a horizontal position and a trigger suspended at each end of said central bore and adapted to be engaged by said spring arm to hold the latter in said position and to release the spring arm when moved, and a plug arranged to enter the opening and being provided with a hook for suspending the bait.

ELMER E. RODGERS.
ARTHUR W. WENGER.
CLAUDE M. RODGERS.